(12) United States Patent
Griffin et al.

(10) Patent No.: US 11,258,580 B2
(45) Date of Patent: Feb. 22, 2022

(54) INSTANTANEOUS KEY INVALIDATION IN RESPONSE TO A DETECTED EAVESDROPPER

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 297 days.

(21) Appl. No.: 16/592,878

(22) Filed: Oct. 4, 2019

(65) Prior Publication Data

US 2021/0105130 A1 Apr. 8, 2021

(51) Int. Cl.
*H04L 29/06* (2006.01)
*H04L 9/00* (2022.01)
*G06N 10/00* (2022.01)
*H04L 9/08* (2006.01)

(52) U.S. Cl.
CPC ............. *H04L 9/002* (2013.01); *G06N 10/00* (2019.01); *H04L 9/0852* (2013.01); *H04L 9/0891* (2013.01); *H04L 63/107* (2013.01); *H04L 63/20* (2013.01)

(58) Field of Classification Search
CPC ..... H04L 9/002; H04L 63/107; H04L 9/0891; H04L 63/20; H04L 9/0852; H04L 9/0858; H04L 63/062; H04L 63/1475; G06N 10/00; G06N 5/04
See application file for complete search history.

(56) References Cited

U.S. PATENT DOCUMENTS

| | | | |
|---|---|---|---|
| 6,801,626 B1 * | 10/2004 | Nambu | H04L 9/0858 380/255 |
| 7,200,866 B2 | 4/2007 | Kim et al. | |
| 7,392,378 B1 * | 6/2008 | Elliott | H04L 63/0428 380/277 |
| 7,441,267 B1 * | 10/2008 | Elliott | H04L 63/0428 713/153 |

(Continued)

FOREIGN PATENT DOCUMENTS

| | | | | |
|---|---|---|---|---|
| CN | 101697512 A | * | 4/2010 | |
| CN | 105553648 A | * | 5/2016 | ........... H04L 9/0858 |

(Continued)

OTHER PUBLICATIONS

Odedoyin, Abiodun, et al., "A Quantum Cryptography Protocol For Access Control in Big Data," International Journal on Cryptography and Information Security, vol. 8, Issue 2, Jun. 2018, 12 pages.

(Continued)

*Primary Examiner* — John B King
(74) *Attorney, Agent, or Firm* — Withrow & Terranova, PLLC

(57) ABSTRACT

Instantaneous key invalidation in response to a detected eavesdropper. A quantum computing system that includes a plurality of qubits and a quantum channel uses a quantum key distribution protocol to generate a key. The quantum computing system determines that an eavesdropper has eavesdropped on the quantum channel. In response to determining that the eavesdropper has eavesdropped on the quantum channel, the quantum computing system sends a key-revocation message to a designated destination.

14 Claims, 14 Drawing Sheets

(56) References Cited

U.S. PATENT DOCUMENTS

| | | |
|---|---|---|
| 7,460,670 B1 | 12/2008 | Elliott |
| 10,103,880 B2 | 10/2018 | Fu |
| 2005/0278700 A1 | 12/2005 | Buskens et al. |
| 2006/0059347 A1* | 3/2006 | Herz .................. H04L 63/06 713/176 |
| 2007/0071244 A1* | 3/2007 | LaGasse ............... H04B 10/70 380/278 |
| 2007/0143827 A1 | 6/2007 | Nicodemus et al. |
| 2013/0251154 A1 | 9/2013 | Tanizawa et al. |
| 2015/0372879 A1 | 12/2015 | Mori |
| 2016/0149700 A1 | 5/2016 | Fu et al. |
| 2016/0197723 A1* | 7/2016 | Takahashi ............ H04L 9/0855 380/255 |
| 2018/0309571 A1 | 10/2018 | Arora |

FOREIGN PATENT DOCUMENTS

| | | | | |
|---|---|---|---|---|
| CN | 108847939 A | * | 11/2018 | |
| CN | 109194479 A | * | 1/2019 | |
| CN | 109286443 A | * | 1/2019 | |
| EP | 3783832 A1 | * | 2/2021 | ........... H04L 9/0855 |
| JP | 2002118545 A | * | 4/2002 | ........... H04L 9/0858 |
| WO | WO-2020177848 A1 | * | 9/2020 | ........... H04L 9/0858 |

OTHER PUBLICATIONS

Tysowksi, Plotr, et al., "The Engineering of a Scalable Multi-Site Communications System Utilizing Quantum Key Distribution (QKD)," Dec. 2017, 34 pages.

Non-Final Office Action for U.S. Appl. No. 16/786,451, dated Sep. 10, 2021, 23 pages.

* cited by examiner

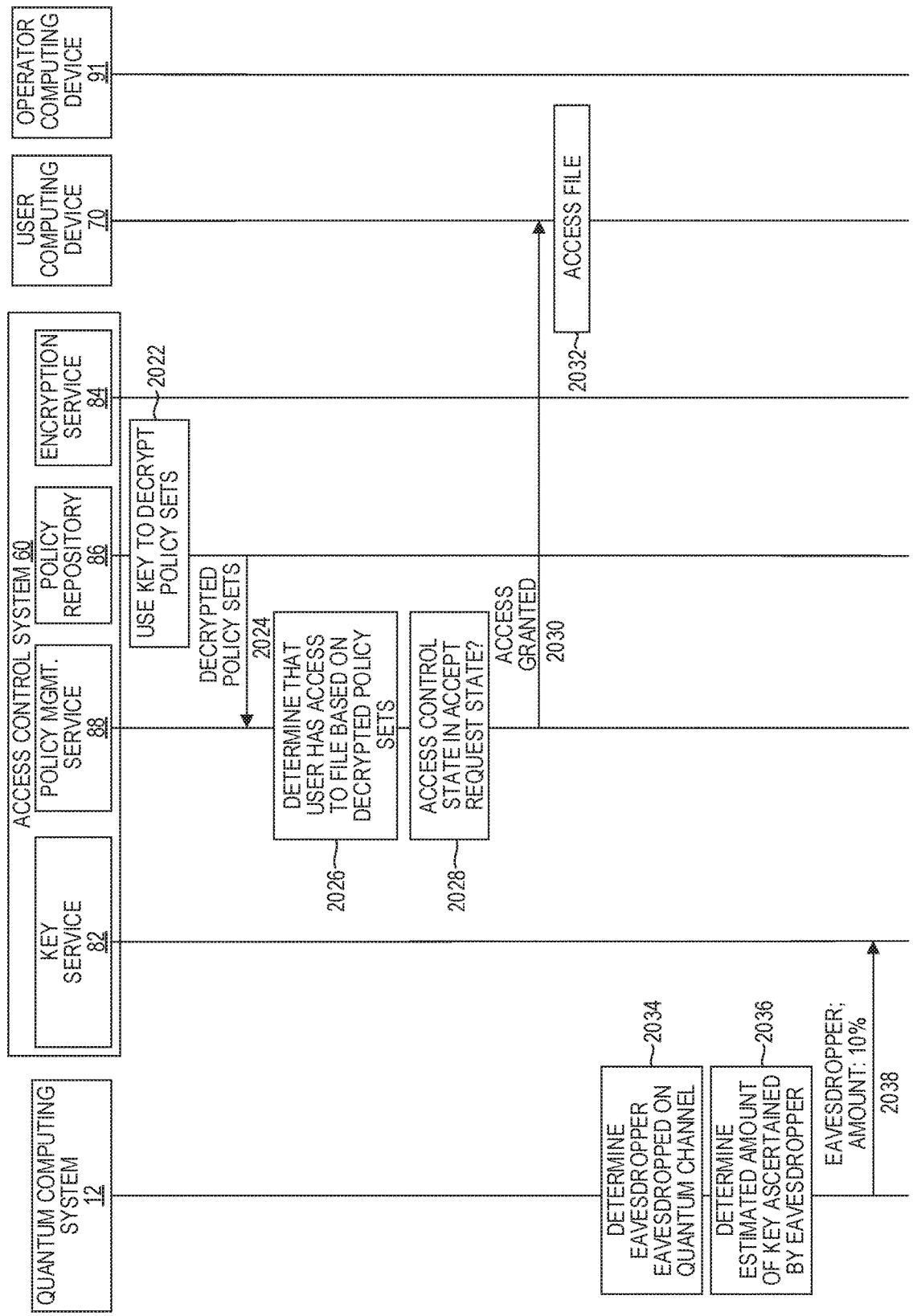

INSTANTANEOUS KEY INVALIDATION IN RESPONSE TO A DETECTED EAVESDROPPER

BACKGROUND

Quantum computing involves the use of quantum bits, referred to herein as "qubits," which have characteristics that differ from those of classical (i.e., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit cannot be described independently of the state of the other qubit.

SUMMARY

The examples utilize a quantum key distribution protocol to generate a key, and, while using the key to encrypt and decrypt data, continually monitor the quantum communication channel used to generate the key. Upon detection of an eavesdropper, a key-revocation message is sent to entities utilizing the key, who may then immediately halt using the key, and, if appropriate, purge any sensitive information encrypted by the key. Because an eavesdropper is detected substantially instantaneously, the entity can safely halt usage of the key and purge any encrypted information prior to the eavesdropper utilizing the key.

In one example a method is provided. The method includes generating, by a quantum computing system comprising a plurality of qubits and a quantum channel using a quantum key distribution protocol, a key. The method further includes determining, by the quantum computing system, that an eavesdropper has eavesdropped on the quantum channel. The method further includes sending a key-revocation message to a designated destination in response to determining that the eavesdropper has eavesdropped on the quantum channel.

In another example a quantum computing system is provided. The quantum computing system includes two qubits, a quantum channel, and a processor device to generate, using a quantum key distribution protocol, a key. The processor device is further to determine that an eavesdropper has eavesdropped on the quantum channel. The processor device is further to send a key-revocation message to a designated destination in response to determining that the eavesdropper has eavesdropped on the quantum channel.

In another example a computer program product is provided. The computer program product is stored on a non-transitory computer-readable storage medium and includes instructions to cause a processor device of a quantum computing system to generate, by the quantum computing system comprising a plurality of qubits and a quantum channel using a quantum key distribution protocol, a key. The instructions further cause the processor device to determine, by the quantum computing system, that an eavesdropper has eavesdropped on the quantum channel. The instructions further cause the processor device to send a key-revocation message to a designated destination in response to determining that the eavesdropper has eavesdropped on the quantum channel.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 7A-7D illustrate a message sequence diagram that identifies example messages communicated between various components illustrated in FIG. 6 and various actions taken by the various components in response to an example scenario;

DETAILED DESCRIPTION

Figure 1:
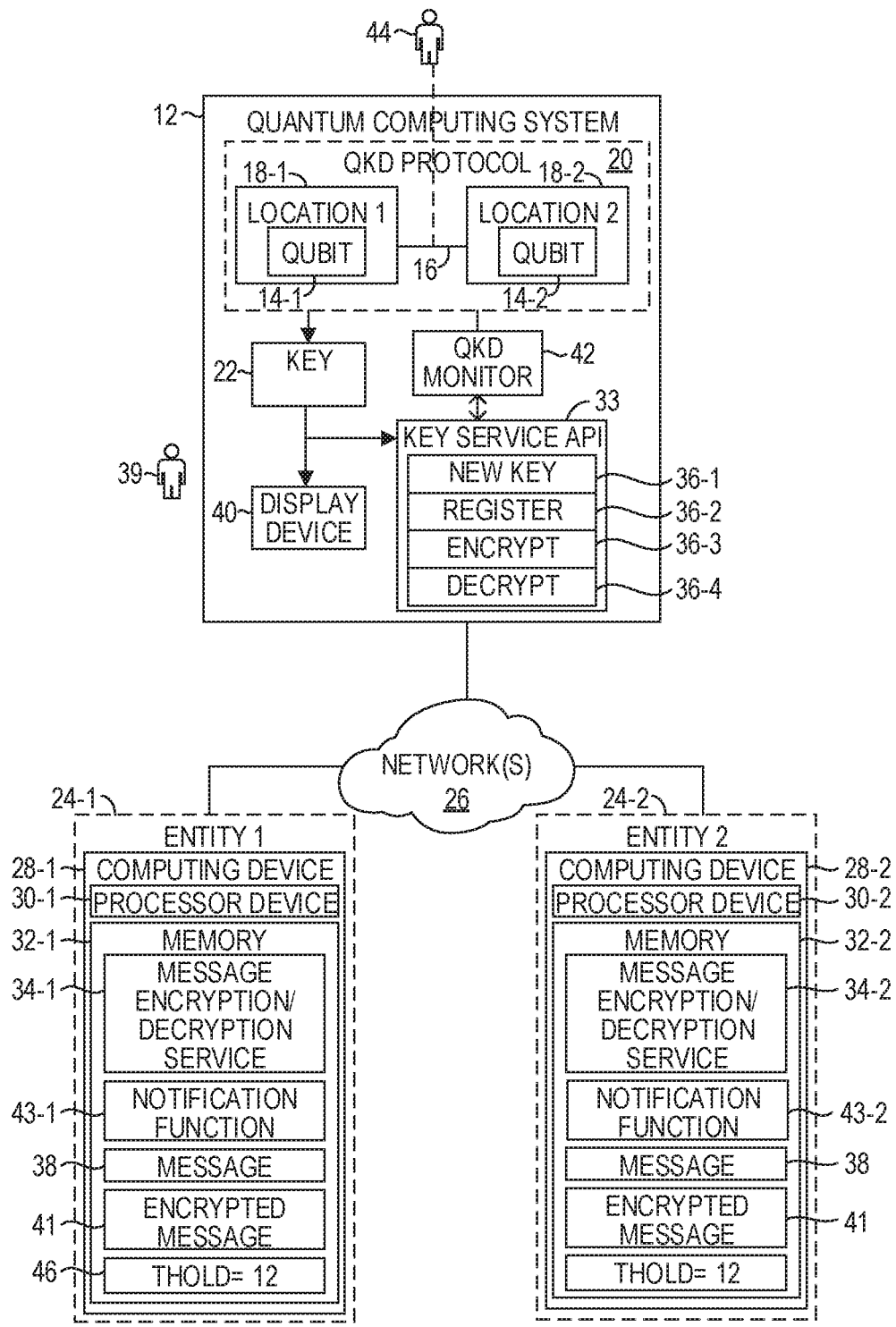
FIG. 1 is a block diagram of an environment in which examples disclosed herein may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum key distribution (QKD) facilitates the generation of a secret key known only to a party, or parties, involved in generating the key. One such QKD protocol is the BB84 protocol. The BB84 protocol utilizes a quantum communication channel and at least two qubits. A unique property of the BB84 protocol is the ability to detect an eavesdropper eavesdropping on the quantum channel.

Certain encrypted information is particularly valuable such that, if the decryption key become known to a nefarious party, it may be desirable to immediately halt usage of encrypted information and even purge or delete the encrypted information before the nefarious party could decrypt the information. Unfortunately, in modern encryption systems, by the time an entity realizes that the encryption system has been hacked, losses have often already occurred.

The examples utilize a QKD protocol to generate a key and, while using the key to encrypt and decrypt data, continually monitor the quantum communication channel used to generate the key. Upon detection of an eavesdropper, a key-revocation message is sent to entities utilizing the key, who may then immediately halt using the key, and, if appropriate, purge any sensitive information encrypted by the key. Because an eavesdropper is detected substantially instantaneously, the entity can safely halt usage of the key and purge any encrypted information prior to the eavesdropper utilizing the key. In some examples, an estimated amount of the key that has been ascertained by the eavesdropper may be determined, and provided in conjunction with the key-revocation message to allow the entity to determine a risk associated with continued use of the key. In some examples, immediately upon detection of an eavesdropper, the qubits are moved to a different quantum communication channel.

FIG. 1 is a block diagram of an environment 10 in which examples disclosed herein may be practiced. The environment 10 includes a quantum computing system 12. The quantum computing system 12 includes a qubit 14-1, a qubit 14-2, and a quantum communication channel 16. The qubit 14-1 may be at a location 18-1, and the qubit 14-2 may be at a location 18-2. The locations 18-1 and 18-2 may be geographically distant from one another, geographically close to another, or may be the same location. The quantum computing system 12 utilizes a quantum key distribution (QKD) protocol 20, such as, by way of non-limiting example, a BB84 QKD protocol, in conjunction with the qubits 14-1, 14-2 and the quantum communication channel 16 to generate a key 22.

The environment 10 includes two entities 24-1 and 24-2 that communicate with one another via one or more networks 26. The entity 24-1 includes a computing device 28-1, which in turn includes a processor device 30-1 and a memory 32-1. The computing device 28-1 receives the key 22. The computing device 28-1 may receive the key 22 in any of a number of different ways. In one example, the quantum computing system 12 may offer an application programming interface (API) 33 that offers a number of functions 36-1-36-4 that can be invoked by the computing device 28-1 to obtain certain services from the quantum computing system 12. In one implementation, the computing device 28-1 may invoke a new-key function 36-1 to cause the quantum computing system 12 to generate the key 22, and the new-key function 36-1 returns the key 22 to the computing device 28-1.

In another implementation, upon generation of the key 22, the quantum computing system 12 may present the key 22 to an operator 39, such as via a display device 40. The operator 39 may then manually configure the computing device 28-1 to have the key 22, thereby eliminating a possibility that an eavesdropper could intercept the key during an electronic communication of the key 22 from the quantum computing system 12 to the computing device 28-1.

A message encryption/decryption service 34-1 of the computing device 28-1 utilizes the key 22 to encrypt a message 38 and thereby generate an encrypted message 41. The key 22 may be the entire encryption key, or may be combined with or otherwise used in conjunction with other data to generate an encryption key. The computing device 28-1 sends the encrypted message 41 to the entity 24-2.

The entity 24-2 includes a computing device 28-2, which in turn includes a processor device 30-2 and a memory 32-2. The computing device 28-2 also obtains the key 22 in one of the ways discussed above with regard to the computing device 28-1. The computing device 28-2 receives the encrypted message 41, and a message encryption/decryption service 34-2 uses the key 22 to decrypt the encrypted message 41 and derive the original message 38.

The quantum computing system 12 includes a QKD monitor 42, which continuously monitors the quantum communication channel 16 for eavesdroppers. Upon detection of an eavesdropper, the quantum computing system 12 may notify any entity that has registered for notifications of the eavesdropper.

In one implementation, the computing device 28-1 registers for notifications of eavesdroppers by invoking a register function 36-2 of the API 33. The register function 36-2 receives from the computing device 28-1 an address of a notification function 43-1 of the computing device 28-1 that is to be invoked by the quantum computing system 12 upon detection of an eavesdropper. Similarly, the computing device 28-2 registers for notifications of eavesdroppers by invoking the register function 36-2, and passing the register function 36-2 an address of a notification function 43-2 of the computing device 28-2 that is to be invoked by the quantum computing system 12 upon detection of an eavesdropper.

For purposes of illustration, assume that the quantum computing system 12 detects an eavesdropper 44. The quantum computing system 12 may also determine an estimated amount of the key 22 that has been ascertained by the eavesdropper 44 via the use of a test statistic. The quantum computing system 12 determines that the computing devices 28-1 and 28-2 have registered for notification of an eavesdropper. The quantum computing system 12 sends the computing devices 28-1 and 28-2 a key-revocation message that indicates an eavesdropper has been detected by invoking the notification functions 43-1, 43-2. The key-revocation message may also include the estimated amount of the key 22 that has been ascertained by the eavesdropper 44. The quantum computing system 12 may also immediately move the qubits 14-1 and 14-2 to a different quantum communication channel.

The computing device 28-1 may immediately invalidate the key 22 to inhibit use of the key 22 to encrypt subsequent messages. Note that the computing device 28-1 is notified of the eavesdropping instantaneously upon detection of the eavesdropping by the eavesdropper 44, and thus the eavesdropper 44 has no opportunity to utilize the key 22 to decrypt any future messages. In one implementation the computing device 28-1 may receive the estimated amount of the key 22 that was ascertained by the eavesdropper 44 and compare the estimated amount to a predetermined threshold amount 46. If the estimated amount of the key 22 ascertained by the eavesdropper 44 is less than the threshold amount 46, then the computing device 28-1 may disregard the key-revocation message and continue to utilize the key 22 to encrypt and decrypt messages for communications with the computing device 28-2.

In one implementation, the computing device 28-1 determines that the estimated amount of the key 22 ascertained by the eavesdropper 44 is greater than the threshold amount 46, and invalidates the key 22. The computing device 28-1 may then invoke the new key function 36-1 to cause the quantum computing system 12 to generate a new key. The computing devices 28-1, 28-2 may then begin using the new key for purposes of encrypting and decrypting messages communicated between the computing devices 28-1, 28-2.

In another implementation, rather than provide the new key to the computing devices 28-1 and 28-2, the computing devices 28-1 and 28-2 may pass communications to the quantum computing system 12 for encryption and decryption. In this implementation, the computing device 28-1 generates the message 38, and passes the message 38 to the quantum computing system 12 via an invocation of an encrypt function 36-3 of the API 33. The quantum computing system 12 uses the key 22 to encrypt the message 38 and generate the encrypted message 41. The encrypt function 36-3 returns the encrypted message 41 to the computing device 28-1. The computing device 28-1 then communicates the encrypted message 41 to the computing device 28-2 via the network(s) 26. The computing device 28-2 receives the encrypted message 41 and passes the encrypted message 41 to the quantum computing device 12 via an invocation of a decrypt function 36-4 of the API 33. The quantum computing system 12 uses the key 22 to decrypt the encrypted message 41 and derives the original message 38. The decrypt function 36-4 returns the message 38 to the computing device 28-2.

In one implementation, the quantum computing system 12 may automatically generate a new key based on some event, such as the passage of a predetermined amount of time. The quantum computing system 12 may then provide the new key to the operator 39, or to any entities who have registered for notifications via the register function 36-2.

Figure 2:
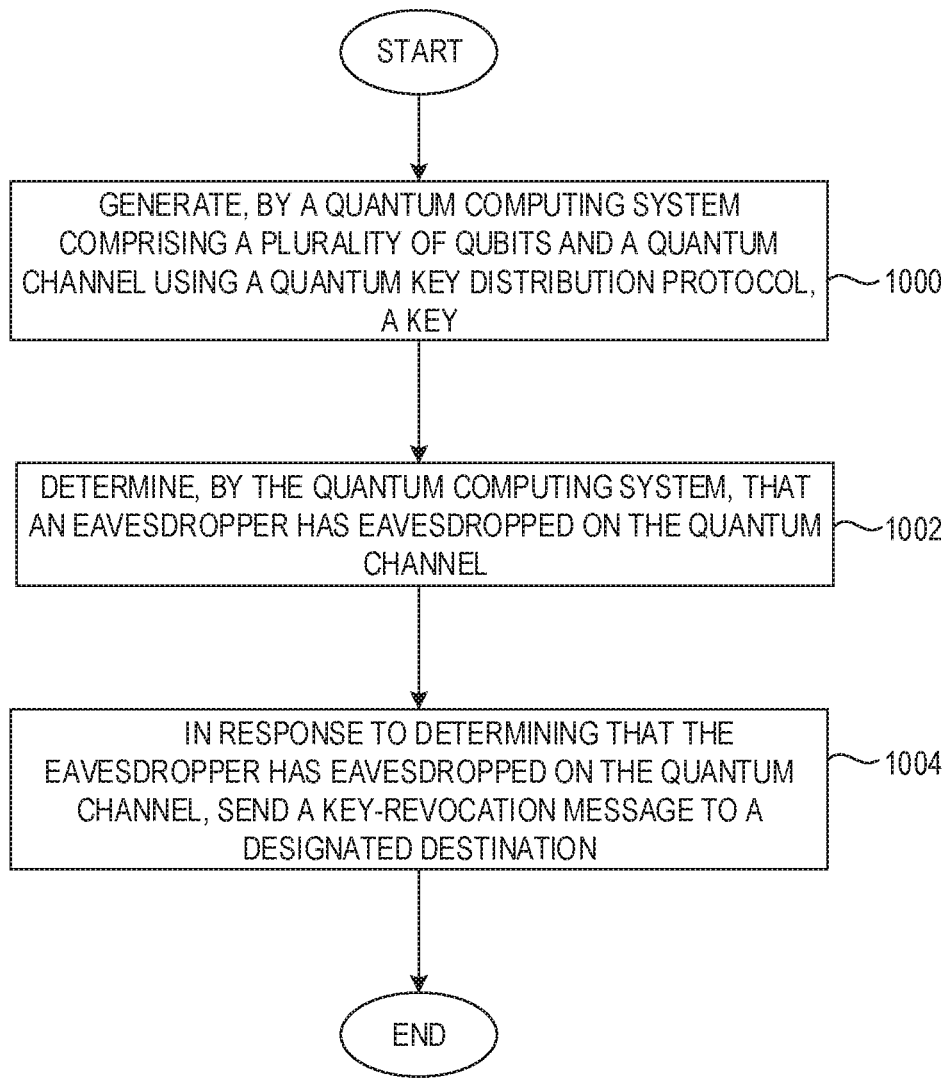
FIG. 2 is a flowchart of a method for instantaneous key invalidation in response to a detected eavesdropper according to one example.

FIG. 2 is a flowchart of a method for instantaneous key invalidation in response to a detected eavesdropper according to one example. FIG. 2 will be discussed in conjunction with FIG. 1. The quantum computing system 12, which includes the plurality of qubits 14-1, 14-2 and the quantum communication channel 16, generates the key 22 using the quantum key distribution protocol 20 (FIG. 2, block 1000). The quantum computing system 12 determines that the eavesdropper 44 has eavesdropped on the quantum communication channel 16 (FIG. 2, block 1002). In response to determining that the eavesdropper 44 has eavesdropped on the quantum communication channel 16, the quantum computing system 12 sends a key-revocation message to a designated destination, such as the computing device 28-1 and/or the computing device 28-2 (FIG. 2, block 1004).

Figure 3:
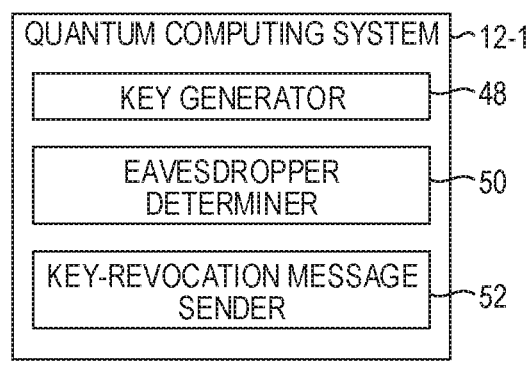
FIG. 3 is a block diagram of a quantum computing system suitable for implementing instantaneous key invalidation in response to a detected eavesdropper according to one implementation.

FIG. 3 is a block diagram of a quantum computing system 12-1 suitable for implementing instantaneous key invalidation in response to a detected eavesdropper according to one implementation. The quantum computing system 12-1 includes a key generator 48 that is configured to generate, using a plurality of qubits, a quantum channel and a quantum key distribution protocol, a key. The quantum key distribution protocol may comprise any suitable quantum key distribution protocol, including, by way of non-limiting example, the BB84 protocol. The quantum computing system 12-1 includes an eavesdropper determiner 50 configured to determine that an eavesdropper has eavesdropped on the quantum channel. The quantum computing system 12-1 includes a key-revocation message sender 52 configured to, in response to determining that the eavesdropper has eavesdropped on the quantum channel, send a key-revocation message to a designated destination.

Figure 4:
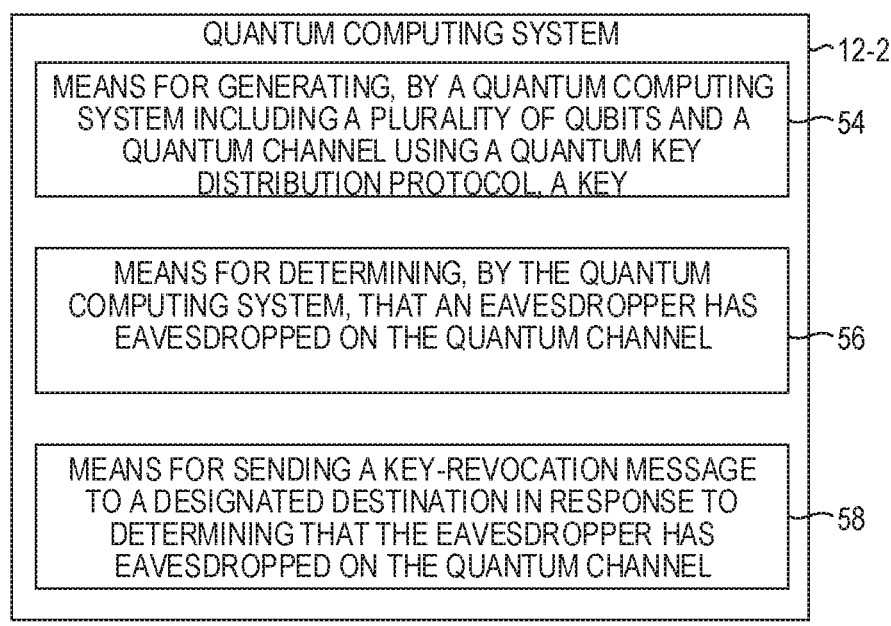
FIG. 4 is a block diagram of a quantum computing system suitable for implementing instantaneous key invalidation in response to a detected eavesdropper according to another implementation.

FIG. 4 is a block diagram of a quantum computing system 12-2 suitable for implementing instantaneous key invalidation in response to a detected eavesdropper according to another implementation. The quantum computing system 12-2 includes means 54 for generating, by the quantum computing system 12-2 including a plurality of qubits and a quantum channel using a quantum key distribution protocol, a key. The means 54 may be implemented in any number of manners, including, for example, via the key generator 48 illustrated in FIG. 3. The quantum computing system 12-2 includes a means 56 for determining, by the quantum computing system 12-2, that an eavesdropper has eavesdropped on the quantum channel. The means 56 may be implemented in any number of manners, including, for example, via the eavesdropper determiner 50 illustrated in FIG. 3. The quantum computing system 12-2 includes a means 58 for sending a key-revocation message to a designated destination in response to determining that the eavesdropper has eavesdropped on the quantum channel. The means 58 may be implemented in any number of manners, including, for example, via the key-revocation message sender 52 illustrated in FIG. 3.

Figure 5:
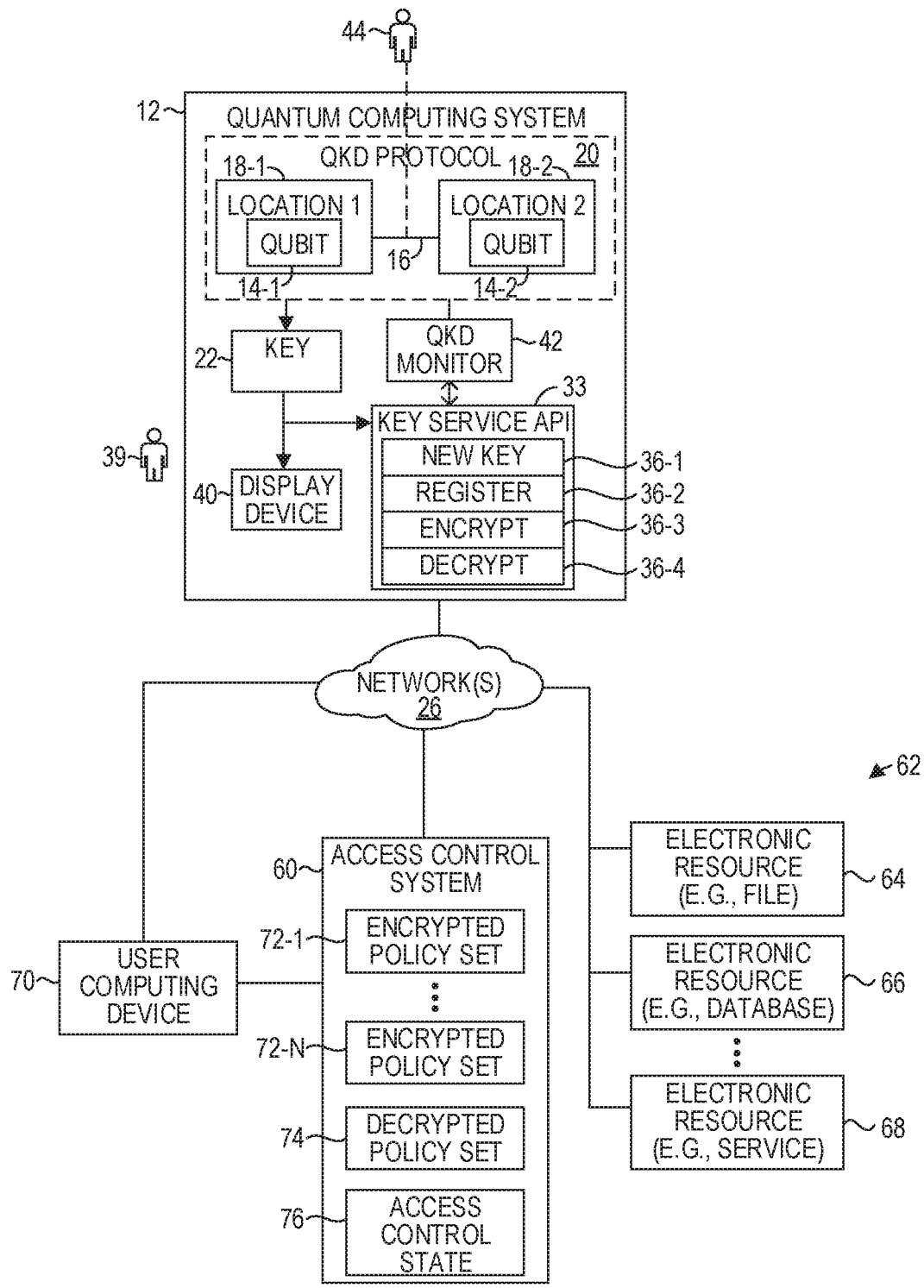
FIG. 5 is a block diagram of an environment that utilizes instantaneous key invalidation in response to a detected eavesdropper for purposes of access control according to one implementation.

FIG. 5 is a block diagram of an environment 10-1 that utilizes instantaneous key invalidation in response to a detected eavesdropper for purposes of access control according to one implementation. The environment 10-1 includes the quantum computing system 12 which operates substantially similarly as discussed above with regard to FIGS. 1-2. The environment 10-1 includes an access control system 60 that governs access to a plurality of electronic resources 62, such as, by way of non-limiting example, one or more files 64, one or more databases 66, and one or more services 68. In particular, in response to a request to access an electronic resource 62 by a user computing device 70, the access control system 60 identifies one or more encrypted policy sets 72-1-72-N (generally, encrypted policy sets 72) that contain access rights information that governs access to an electronic resource 62 by an entity. The access rights information in the encrypted policy sets 72 may be based on any desired criteria, such as the user associated with the user computing device 70, a time of day of the request, a geographic location of the user computing device 70, an IP address of the user computing device 70, or the like.

The encrypted policy sets 72 have been encrypted utilizing the key 22 generated by the quantum computing system 12. In one implementation, the operator 39 accesses policy sets that are stored in a trusted and secure location, generates the encrypted policy sets 72 using the key 22, and installs the encrypted policy sets 72 in a location accessible by the access control system 60. The access control system 60 is also provided the key 22, such as via a runtime parameter, or via a configuration file, or the like.

In another implementation, the access control system 60 may interact with the quantum computing system 12 via the API 33, similar to the manner described above with respect to the computing device 28-1 and FIG. 1. In such implementation, the access control system 60 may receive the key 22 from the quantum computing system 12 via the new key function 36-1, and may then access the policy sets in the trusted and secure location, and generate the encrypted policy sets 72 using the key 22.

The access control system 60 registers for notifications of eavesdroppers by invoking the register function 36-2 of the API 33, and passes to the register function 36-2 an address of a notification function of the access control system 60 that is to be invoked by the quantum computing system 12 upon detection of an eavesdropper.

As an example of instantaneous key invalidation in response to a detected eavesdropper for purposes of access control according to one implementation, assume that the user computing device 70 sends a request to the access control system 60 to access a particular file 64. The access control system 60 identifies at least one encrypted policy set 72-1-72-N of the plurality of encrypted policy sets 72 that governs access to the file 64 by the user computing device 70. The access control system 60 decrypts the encrypted policy set 72 using the key 22 to generate a decrypted policy set 74. The access control system 60 access an access control state 76 and determines that the access control state 76 is in the accept request state, and, based on the decrypted policy set 74, sends a message that grants the user computing device 70 access to the file 64. In some implementations, the access control system 60 may immediately delete the decrypted policy set 74.

The user computing device 70 then sends a request to the access control system 60 to access a particular database 66. The access control system 60 identifies at least one encrypted policy set 72-1-72-N that governs access to the database 66 by the user computing device 70. At this instant, the quantum computing system 12 detects the eavesdropper 44. The quantum computing system 12 determines that the access control system 60 has registered for notification of an eavesdropper. The quantum computing system 12 sends the access control system 60 a key-revocation message that indicates the eavesdropper 44 has been detected by invoking the respective notification function provided by the access control system 60. The access control system 60 sets the access control state 76 to a deny request state and sends a message that denies the user computing device 70 access to the database 66. In some implementations, the access control system 60 may immediately delete the encrypted policy sets 72. Because the access control system 60 received the key-revocation message instantaneously, i.e., concurrently or substantially concurrently with the detection of the eavesdropper 44, the eavesdropper 44, even if successful in ascertaining the complete key 22, cannot utilize the key 22 to decrypt the encrypted policy sets 72 and utilize the access rights identified in the encrypted policy sets 72 to hack the electronic resources 62.

Figure 6:
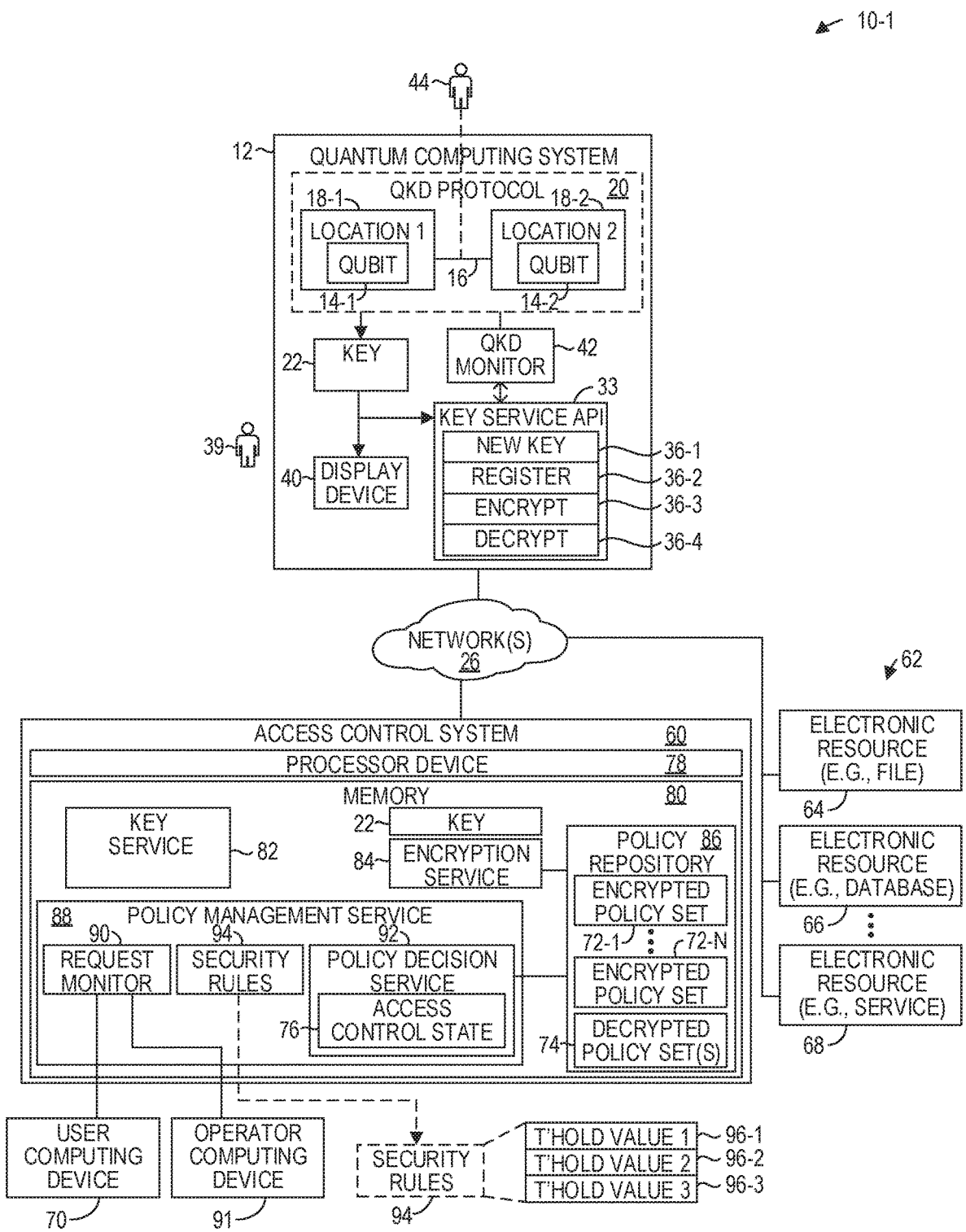
FIG. 6 is a block diagram of the environment illustrated in FIG. 5 illustrating additional details according to one implementation.

FIG. 6 is a block diagram of the environment 10-1 illustrated in FIG. 5 illustrating additional details according to one implementation. In this implementation the access control system 60 includes a processor device 78 and a memory 80. The memory 80 includes a key service 82 that is configured to receive messages, such as notifications of eavesdroppers, from the quantum computing system 12. An encryption service 84 is configured to obtain the key 22 generated by the quantum computing system 12. The key 22 may be obtained via, for example, the new key function 36-1 or the operator 39. The encryption service 84 accesses a plurality of policy sets from a secure and trusted location and uses the key 22 to generate the plurality of encrypted policy sets 72. The plurality of encrypted policy sets 72 may be maintained in a policy repository 86.

A policy management service 88 includes a request monitor 90 that is configured to receive requests from entities, such as the user computing device 70, that seek permission to access an electronic resource 62. The request monitor 90 may be configured to receive configuration commands or other information from an operator via an operator computing device 91. The policy management service 88 also includes a policy decision service 92 that requests one or more decrypted policy sets from the policy repository 86 in response to a request to access an electronic resource 62, and, based on the one or more decrypted policy sets 74 and the access control state 76, grants or denies access.

Security rules 94 may contain rules regarding actions to be taken upon notification of an eavesdropper from the quantum computing system 12. By way of non-limiting example, the security rules 94 may identify three threshold values 96-1-96-3 that identify various actions to take in response to notification of an eavesdropper and an estimate of the amount of the key 22 that was ascertained by the eavesdropper. As an example, if the estimate of the amount of the key 22 ascertained by the eavesdropper 44 is greater than the threshold value 96-3, the access control system 60 may set the access control state 76 to a deny request state and immediately delete the encrypted policy sets 72. If the estimate of the amount of the key 22 ascertained by the eavesdropper 44 is greater than the threshold value 96-2 but less than the threshold value 96-3, the access control system 60 may set the access control state 76 to a deny request state and present the estimate of the amount of the key 22 ascertained by the eavesdropper 44 to the operator via the operator computing device 91. The operator may then decide whether to reset the access control state 76 to the accept request state or to take an alternate action. If the estimate of the amount of the key 22 ascertained by the eavesdropper 44 is greater than the threshold value 96-1 but less than the threshold value 96-2, the access control system 60 may keep the access control state 76 in the accept request state but present the estimate of the amount of the key 22 ascertained by the eavesdropper 44 to the operator via the operator computing device 91. If the estimate of the amount of the key 22 ascertained by the eavesdropper 44 is less than the threshold value 96-1, the access control system 60 may simply disregard the notification of the eavesdropper from the quantum computing system 12.

Figure 7A:
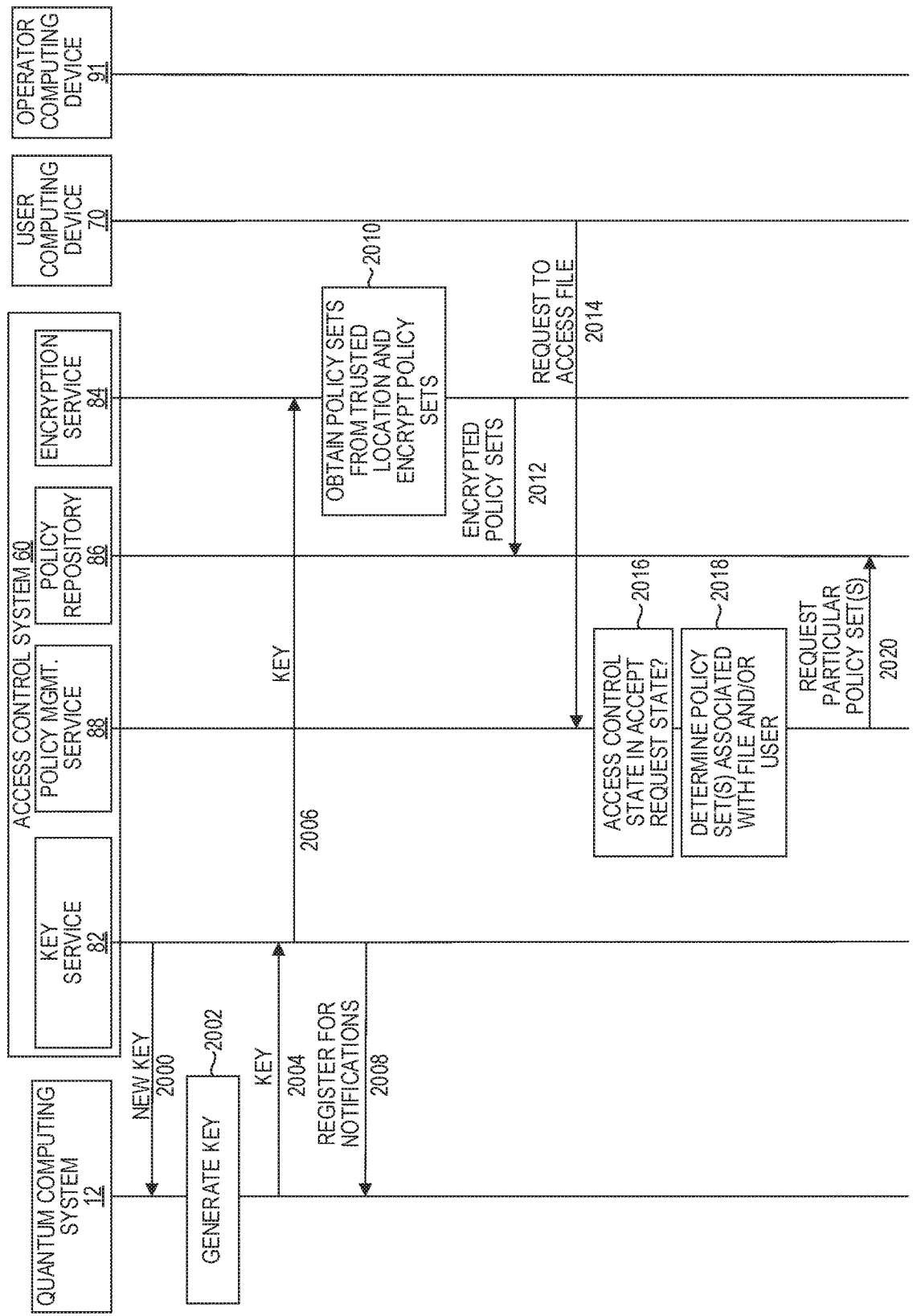

FIGS. 7A-7D illustrate a message sequence diagram that identifies example messages communicated between various components illustrated in FIG. 6 and various actions taken by the various components in response to an example scenario. FIGS. 7A-7D will be discussed in conjunction with FIG. 6, and various elements illustrated in FIG. 6 will be discussed with reference to FIGS. 7A-7D. Referring first to FIG. 7A, the key service 82 invokes the new key function 36-1 of the quantum computing system 12 to request a new key (step 2000). The quantum computing system 12 utilizes the QKD protocol 20, the two qubits 14-1, 14-2 and the quantum communication channel 16 to generate a new key 22 (step 2002). The quantum computing system 12 sends the key 22 to the key service 82 (step 2004). The key service 82 sends the key 22 to the encryption service 84 (step 2006). The key service 82 invokes the register function 36-2 to register the access control system 60 for notifications of eavesdroppers, and provides the register function 36-2 the address of the key service 82 (step 2008).

The encryption service 84 obtains the policy sets from a trusted and secure location and encrypts the policy sets to generate the plurality of encrypted policy sets 72, and stores the encrypted policy sets 72 in the policy repository 86 (steps 2010, 2012). The user computing device 70 sends the policy management service 88 a request to access a file 64 (step 2014). The policy management service 88 determines that the access control state 76 is in an accept request state (step 2016). The policy management service 88 determines a particular policy set 72 or policy sets 72 that identify the access rights to the file 64 by the user computing device 70 (step 2018). The policy management service 88 requests the particular policy set 72 or policy sets 72 from the policy repository 86 (step 2020).

Referring now to FIG. 7B, the policy repository 86 uses the key 22 to decrypt the particular policy set(s) 72 to generate decrypted policy set(s) 74, and sends the decrypted policy set(s) 74 to the policy management service 88 (steps 2022, 2024). The policy management service 88 determines, based on the decrypted policy set(s) 74, that the user computing device 70 has access rights to the file 64 (step 2026). The policy management service 88 again confirms that the access control state 76 is in an accept request state (step 2028). The policy management service 88 sends a message to the user computing device 70 that access to the file 64 is granted (step 2030).

The quantum computing system 12 determines that an eavesdropper 44 is eavesdropping on the quantum communication channel 16 (step 2034). The quantum computing system 12 determines an estimated amount of the key 22 that has been ascertained by the eavesdropper 44 (step 2036). The quantum computing system 12 sends a key-revocation message to the key service 82, along with the estimated amount of the key 22 that has been ascertained by the eavesdropper 44 (in this example, 10%) (step 2038).

Figure 7C:
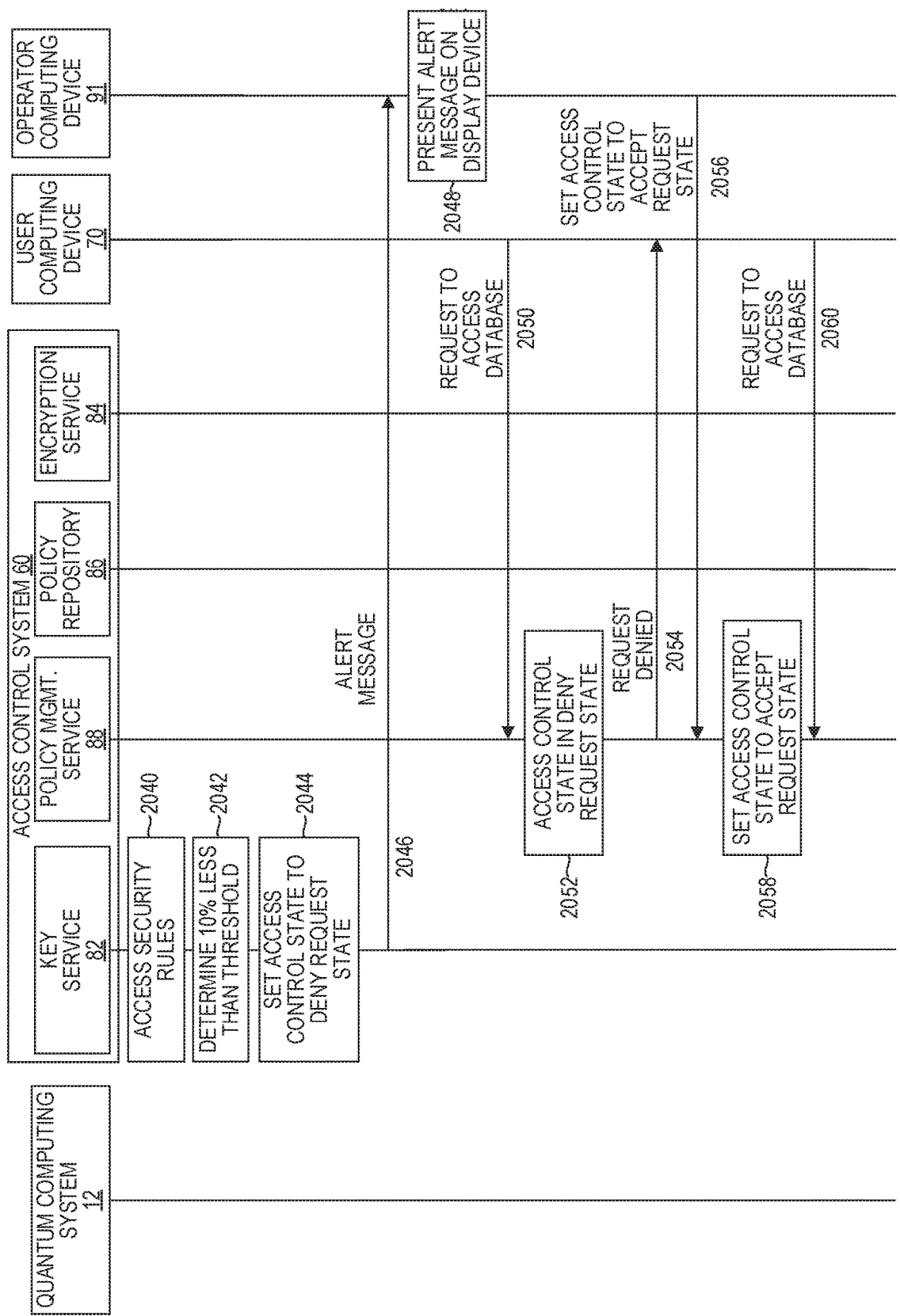

Referring now to FIG. 7C, the key service 82 accesses the security rules 94 (step 2040). The key service 82 determines that the estimated amount of the key 22 that has been ascertained by the eavesdropper 44 is less than the threshold value 96-3 and greater than the threshold value 96-2, and thus sets the access control state 76 to the deny request state (steps 2042, 2044). The key service 82 sends an alert message to the operator computing device 91 that identifies the estimated amount of the key 22 that has been ascertained by the eavesdropper 44, and that indicates that the access control system 60 has been placed in the deny request state (step 2046). The operator computing device 91 presents the message on a display device (step 2048).

The user computing device 70 sends a request to the policy management service 88 to access the database 66 (step 2050). The policy management service 88 determines that the access control state 76 is in the deny request state (step 2052). The policy management service 88 sends a message to the user computing device 70 denying the request to access the database 66 (step 2054).

An operator or other individual reviews the alert message and decides that a new key need not be generated based on the estimated amount of the key 22 that has been ascertained by the eavesdropper 44, and enters a command at the operator computing device 91 to set the access control state 76 to the accept request state. The operator computing device 91 sends a request to the policy management service 88 to set the access control state 76 to the accept request state (step 2056). The policy management service 88 sets the access control state 76 to the accept request state (step 2058). The user computing device 70 again sends a request to the policy management service 88 to access the database 66 (step 2060).

Figure 7D:
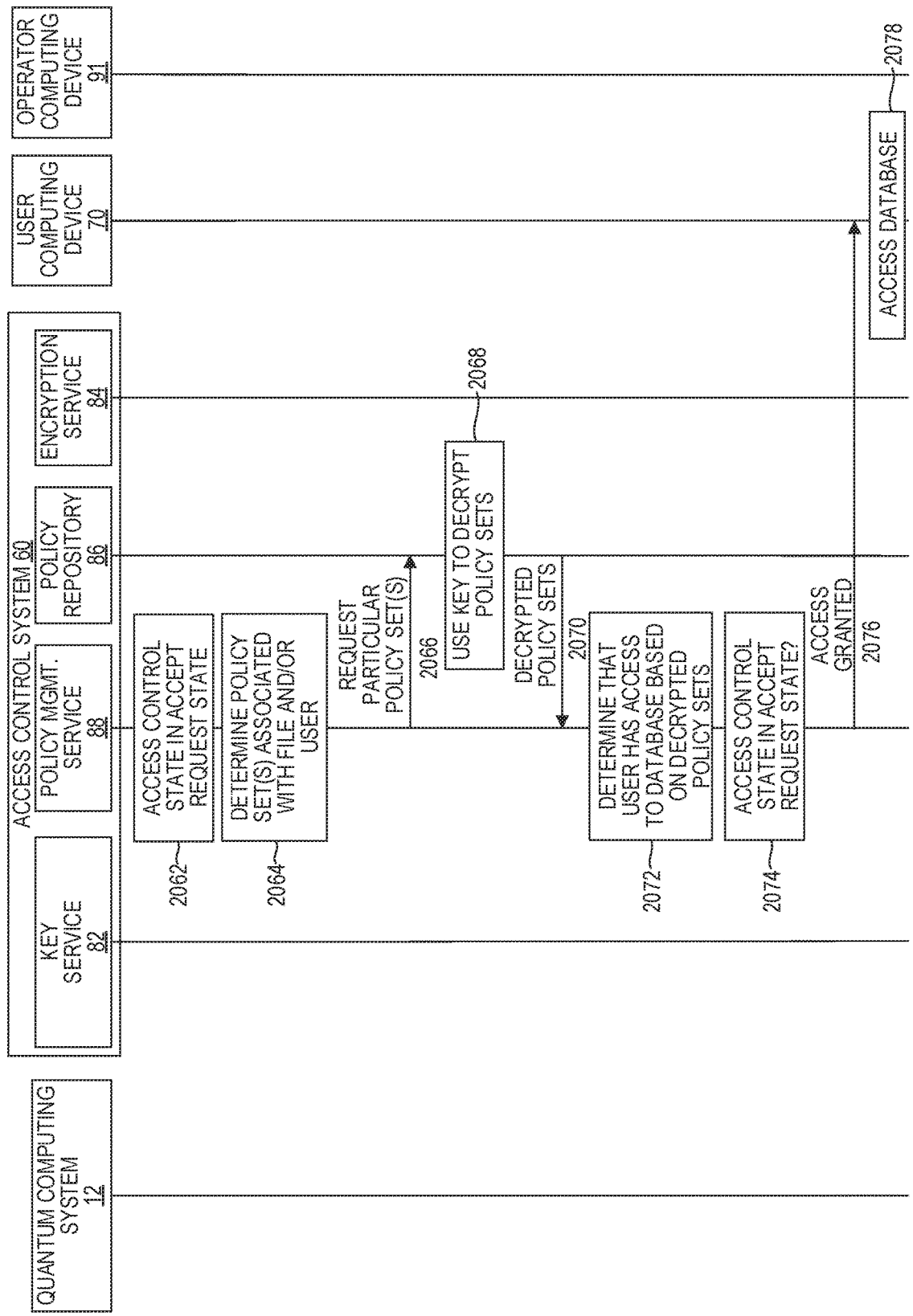

Referring now to FIG. 7D, the policy management service 88 determines that the access control state 76 is in the accept request state (step 2062). The policy management service 88 determines a particular policy set 72 or policy sets 72 that identify the access rights to the database 66 by the user computing device 70 (step 2064). The policy management service 88 requests the particular policy set 72 or policy sets 72 from the policy repository 86 (step 2066). The policy repository 86 uses the key 22 to decrypt the particular policy set(s) 72 to generate decrypted policy set(s) 74, and sends the decrypted policy set(s) 74 to the policy management service 88 (steps 2068, 2070). The policy management service 88 determines, based on the decrypted policy set(s) 74, that the user computing device 70 has access rights to the database 66 (step 2072). The policy management service 88 again confirms that the access control state 76 is in the accept request state (step 2074). The policy management service 88 sends a message to the user computing device 70 that access to the database 66 is granted (step 2076). The user computing device 70 accesses the database 66 (step 2078).

Figure 8:
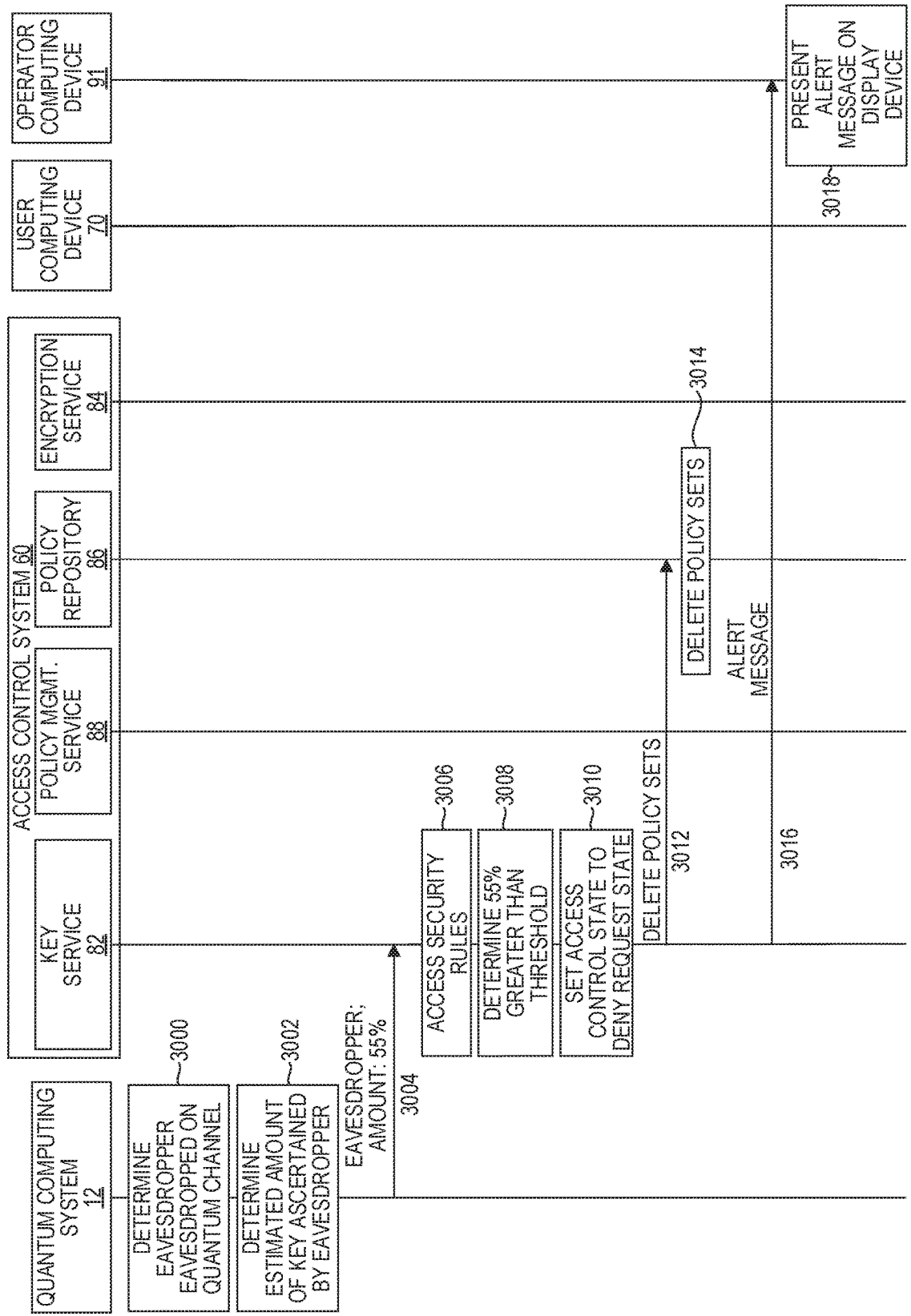
FIG. 8 illustrates a message sequence diagram that identifies example messages communicated between various components illustrated in FIGS. 6 and 7A-7D in an alternative scenario to that described in FIGS. 7A-7D.

FIG. 8 illustrates a message sequence diagram that identifies example messages communicated between various components illustrated in FIGS. 6 and 7A-7D in an alternative scenario to that described in FIGS. 7A-7D. In particular, in this scenario, the quantum computing system 12 again determines that an eavesdropper 44 is eavesdropping on the quantum communication channel 16 (step 3000). The quantum computing system 12 determines an estimated amount of the key 22 that has been ascertained by the eavesdropper 44 (step 3002). The quantum computing system 12 sends a key-revocation message to the key service 82, along with the estimated amount of the key that has been ascertained by the eavesdropper 44 (in this example, 55%) (step 3004).

The key service 82 accesses the security rules 94 (step 3006). The key service 82 determines that the estimated amount of the key 22 that has been ascertained by the eavesdropper 44 is greater than the threshold value 96-3, and thus sets the access control state 76 to the deny request state (steps 3008, 3010). The key service 82 sends a message to the policy repository 86 to delete the policy sets 72 (step 3012). The policy repository 86 deletes the policy sets 72 (step 3014). The key service 82 sends an alert message to the operator computing device 91 that identifies the estimated amount of the key 22 that has been ascertained by the eavesdropper 44, and that indicates that the policy sets 72 have been deleted (step 3016). The operator computing device 91 presents the alert message on the display device (step 3018).

Figure 9:
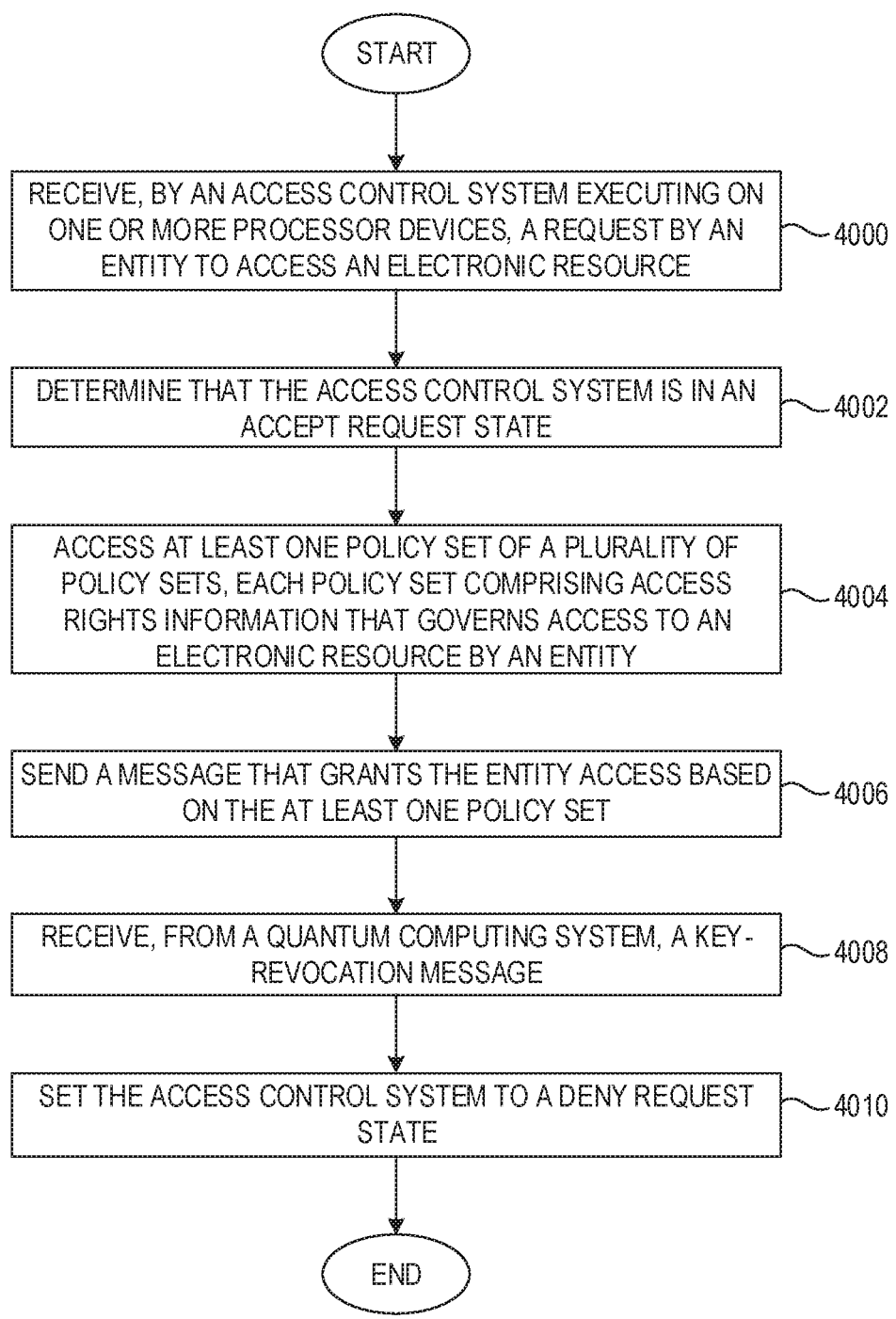
FIG. 9 is a flowchart of a method for instantaneous key invalidation in response to a detected eavesdropper in the context of an access control system according to one implementation.

FIG. 9 is a flowchart of a method for instantaneous key invalidation in response to a detected eavesdropper in the context of an access control system according to one implementation. FIG. 9 will be discussed in conjunction with FIG. 6. The access control system 60 receives a request by an entity, such as, in this example, the user computing device 70, to access an electronic resource 62 (FIG. 9, block 4000). The access control system 60 determines that the access control system 60 is in an accept request state (FIG. 9, block 4002). The access control system 60 accesses at least one policy set 72 of the plurality of policy sets 72, each policy set 72 comprising access rights information that governs access to an electronic resource 62 by an entity (FIG. 9, block 4004).

The access control system 60 sends a message that grants the user computing device 70 access based on the at least one policy set 72 (FIG. 9, block 4006). The access control system 60 receives, from the quantum computing system 12, a key-revocation message (FIG. 9, block 4008). The access control system 60 sets the access control system 60 to a deny request state (FIG. 9, block 4010).

Figure 10:
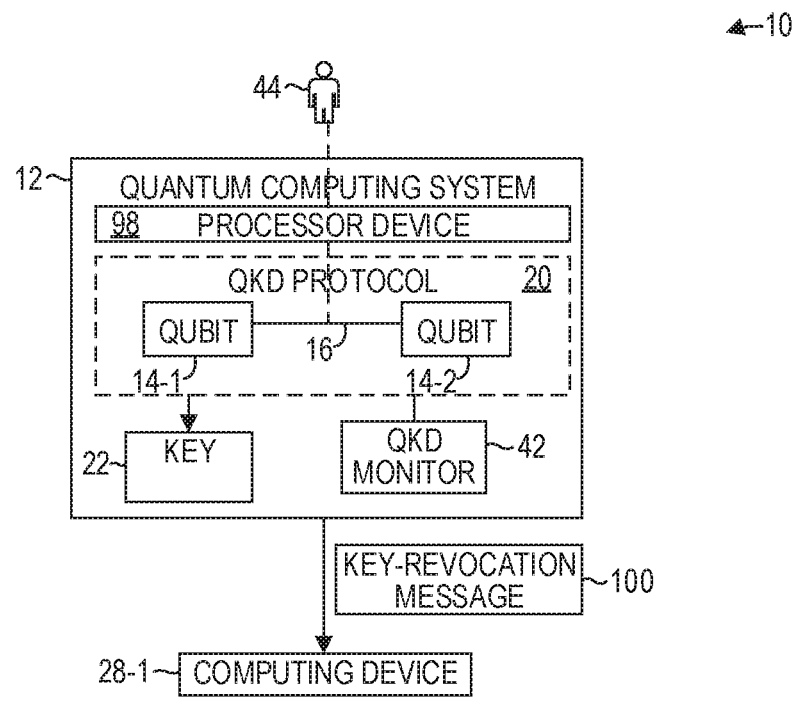
FIG. 10 is a simplified block diagram of the environment illustrated in FIG. 1 according to another implementation.

FIG. 10 is a simplified block diagram of the environment 10 illustrated in FIG. 1 according to another implementation. The quantum computing system 12 includes the two qubits 14-1, 14-2, the quantum communication channel 16, and a processor device 98. The processor device 98 is to generate, using the quantum key distribution protocol 20, the key 22. The processor device 98 is to determine that the eavesdropper 44 has eavesdropped on the quantum communication channel 16. In response to determining that the eavesdropper 44 has eavesdropped on the quantum communication channel 16, the processor device 98 is to send a key-revocation message 100 to a designated destination, such as the computing device 28-1.

Figure 11:
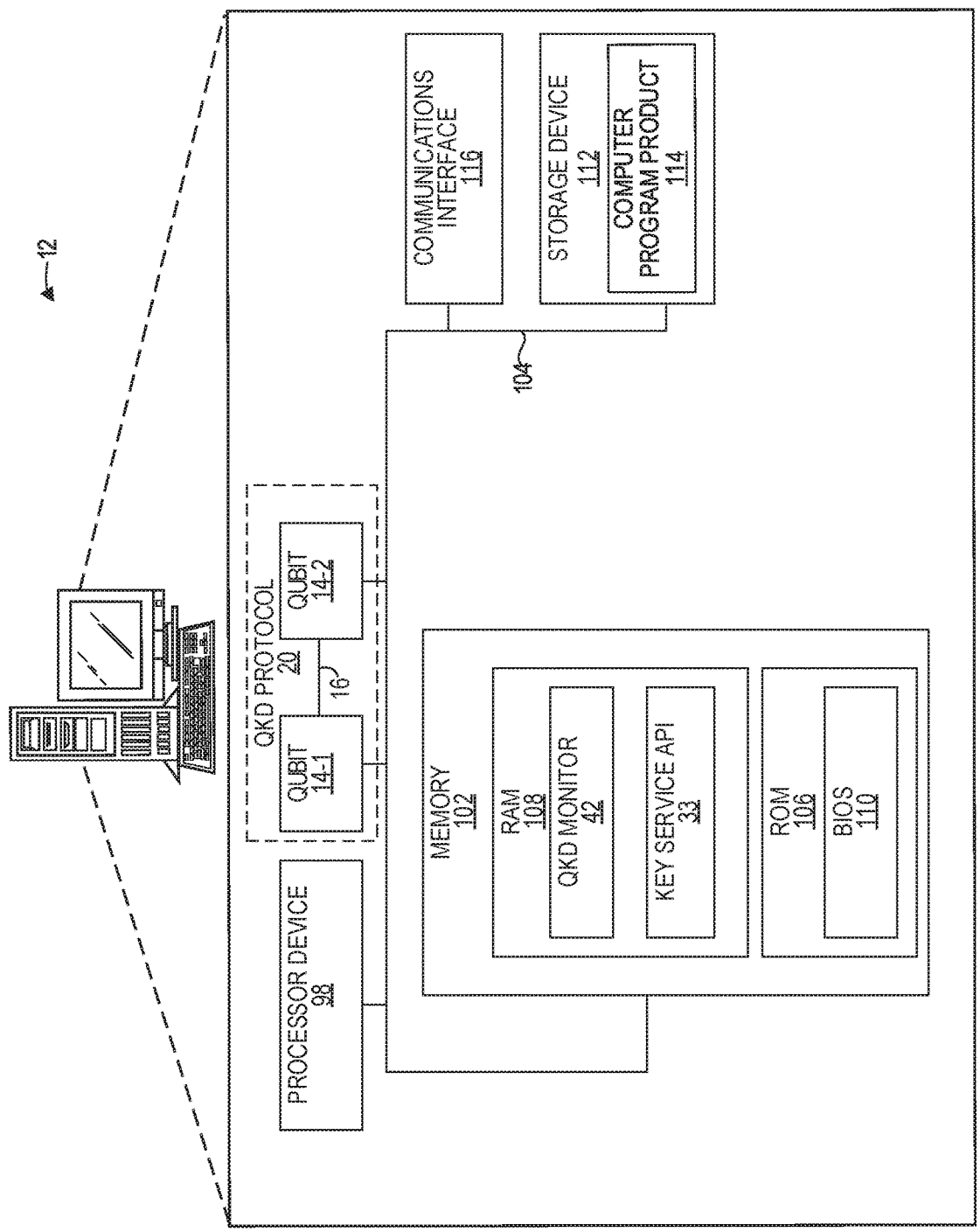
FIG. 11 is a block diagram of the quantum computing system illustrated in FIG. 1 according to another implementation.

FIG. 11 is a block diagram of the quantum computing system 12 suitable for implementing examples according to one example. All or portions of the quantum computing system 12 may operate at cold temperatures, such as at approximately −273 Celsius. The quantum computing system 12 is capable of operating on quantum information, such as via the qubits 14-1 and 14-2, and also operating on classical binary information. The quantum computing system 12 includes at least one processor device 98, at least one system memory 102, and a system bus 104. The system bus 104 provides an interface for system components including, but not limited to, the system memory 102 and the processor device 98. The processor device 98 can be any commercially available or proprietary processor.

The system bus 104 may be any of several types of bus structures that may further interconnect to a memory bus (with or without a memory controller), a peripheral bus, and/or a local bus using any of a variety of commercially available bus architectures. The system memory 102 may include non-volatile memory 106 (e.g., read-only memory (ROM), erasable programmable read-only memory (EPROM), electrically erasable programmable read-only memory (EEPROM), etc.), and volatile memory 108 (e.g., random-access memory (RAM)). A basic input/output system (BIOS) 110 may be stored in the non-volatile memory 106 and can include the basic routines that help to transfer information between elements within the quantum computing system 12. The volatile memory 108 may also include a high-speed RAM, such as static RAM, for caching data.

The quantum computing system 12 further includes at least one quantum communication channel 16 coupled between at least two qubits 14-1-14-2. As discussed above, while for purposes of illustration the quantum computing system 12 is depicted at a single location, components of the quantum computing system 12 may be geographically remote from one another.

The quantum computing system 12 may include or be coupled to a non-transitory computer-readable storage medium such as a storage device 112, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 112 and other drives associated with computer-readable media and computer-usable media may provide non-volatile storage of data, data structures, computer-executable instructions, and the like.

A number of modules can be stored in the storage device 112 and in the volatile memory 108, including, by way of non-limiting example, the QKD monitor 42 and the key service API 33, which may implement the functionality described herein in whole or in part.

All or a portion of the examples may be implemented as a computer program product 114 stored on a transitory or non-transitory computer-usable or computer-readable storage medium, such as the storage device 112, which includes complex programming instructions, such as complex computer-readable program code, to cause the processor device 98 to carry out the steps described herein. Thus, the computer-readable program code can comprise software instructions for implementing the functionality of the examples described herein when executed on the processor device 98. The quantum computing system 12 may also include a communications interface 116 suitable for communicating with the network(s) 26 as appropriate or desired.

Other computer system designs and configurations may also be suitable to implement the systems and methods described herein. The following examples illustrate various additional implementations in accordance with one or more aspects of the disclosure.

Example 1 is an access control system that includes a memory and one or more processor devices coupled to the memory. The one or more processor devices are to receive a request by an entity to access an electronic resource; determine that an access control system is in an accept request state; access at least one policy set of a plurality of policy sets, each encrypted policy set comprising access rights information that governs access to an electronic resource by an entity; send a message that grants the entity access based on the at least one policy set; receive, from a quantum computing system, a key-revocation message; and set the access control system to a deny request state.

Example 2 is the access control system of example 1 wherein the one or more processor devices are further to: receive a request by an entity to access the electronic resource; determine that the access control system is in the deny request state; and send a message that denies the entity access based on the at least one policy set.

Example 3 is the access control system of example 1 wherein the one or more processor devices are further to: receive, from the quantum computing system, an estimated amount that a key used to encrypt the one or more policies has been ascertained by an eavesdropper; determine that the estimated amount of the key ascertained by the eavesdropper exceeds a predetermined threshold; and based on determining that the estimated amount of the key ascertained by the eavesdropper exceeds the predetermined threshold, delete the plurality of policy sets.

Example 4 is the access control system of example 1 wherein the one or more processor devices are further to: receive, from the quantum computing system, an estimated amount that a key used to encrypt the one or more policies has been ascertained by an eavesdropper; send, to an alert destination, the estimated amount of the key ascertained by the eavesdropper; receive, by the access control system, a command to set the access control state to the accept request state; and set the access control state to the accept request state.

Example 5 is the access control system of example 1 wherein the one or more processor devices are further to: receive, from the quantum computing system, a key; and use the key to decrypt the at least one policy set of the plurality of policy sets.

Example 6 is the access control system of example 1 wherein the one or more processor devices are further to: send, to the quantum computing system, a request for a new key; receive, from the quantum computing system, the new key; and encrypt the plurality of policy sets with the new key.

Example 7 is a method comprising: receiving, by an access control system executing on one or more processor devices, a request by an entity to access an electronic resource; determining that the access control system is in an accept request state; accessing at least one policy set of a plurality of policy sets, each policy set comprising access rights information that governs access to an electronic resource by an entity; sending a message that grants the entity access based on the at least one policy set; receiving, from a quantum computing system, a key-revocation message; and setting the access control system to a deny request state.

Example 8 is the method of example 7 further comprising: receiving a request by an entity to access an electronic resource; determining that the access control system is in the deny request state; and sending a message that denies the entity access based on the at least one policy set.

Example 9 is the method of example 7 further comprising: receiving, from the quantum computing system, an estimated amount that a key used to encrypt the one or more policies has been ascertained by an eavesdropper; determining that the estimated amount of the key ascertained by the eavesdropper exceeds a predetermined threshold; and, based on determining that the estimated amount of the key ascertained by the eavesdropper exceeds the predetermined threshold, deleting the plurality of policy sets.

Example 10 is the method of example 7 further comprising: receiving, from the quantum computing system, an estimated amount that a key used to encrypt the one or more policies has been ascertained by an eavesdropper; sending, to an alert destination, the estimated amount of the key ascertained by the eavesdropper; receiving, by the access control system, a command to set the access control state to the accept request state; and setting the access control state to the accept request state.

Example 11 is a computing device comprising a memory and a processor device coupled to the memory. The processor device is to receive a key generated by a quantum computing system using a quantum key distribution protocol; encrypt, by the processor device, a message using the key to generate a first encrypted message; and send, by the computing device, the first encrypted message to a second computing device.

Example 12 is the computing device of example 11 wherein the processor device is further to: receive, from the quantum computing system, a key-revocation message; and in response to receiving the key-revocation message, invalidate the key to inhibit use of the key to encrypt subsequent messages.

Example 13 is the computing device of example 11 wherein the processor device is further to: receive, from the quantum computing system, a key-revocation message and an estimated amount of the key ascertained by the eavesdropper; determine that the estimated amount of the key ascertained by the eavesdropper is less than a threshold amount; subsequent to determining that the estimated amount of the key ascertained by the eavesdropper is less than the threshold amount, encrypt a message using the key to generate a second encrypted message; and send the second encrypted message to a second computing device.

Example 14 is the computing device of example 11 wherein the processor device is further to: receive, from a second computing device, a second encrypted message; and decrypt the second encrypted message using the key.

Example 15 is a computing device comprising a memory and a processor device coupled to the memory. The processor device is to receive a key generated by a quantum computing system using a quantum key distribution protocol; encrypt a message using the key to generate an encrypted message; and send the encrypted message to a second computing device.

Example 16 is the computing device of example 15 wherein the processor device is further to: receive, from the quantum computing system, a key-revocation message; and in response to receiving the key-revocation message, invalidate the key to inhibit use of the key to encrypt subsequent messages.

Example 17 is a quantum computing system that comprises a key generator that is configured to generate, using a plurality of qubits, a quantum channel and a quantum key distribution protocol, a key; an eavesdropper determiner configured to determine that an eavesdropper has eavesdropped on the quantum channel; and a key-revocation message sender configured to, in response to determining that the eavesdropper has eavesdropped on the quantum channel, send a key-revocation message to a designated destination.

Example 18 is a quantum computing system that comprises a means for generating, by a quantum computing system comprising a plurality of qubits and a quantum channel using a quantum key distribution protocol, a key; a means for determining, by the quantum computing system, that an eavesdropper has eavesdropped on the quantum channel; and, in response to determining that the eavesdropper has eavesdropped on the quantum channel, a means for sending a key-revocation message to a designated destination.

Individuals will recognize improvements and modifications to the preferred examples of the disclosure. All such improvements and modifications are considered within the scope of the concepts disclosed herein and the claims that follow.

What is claimed is:

1. A method comprising:
   generating, by a quantum computing system comprising a plurality of qubits and a quantum channel using a quantum key distribution protocol, a key;
   determining, by the quantum computing system, that an eavesdropper has eavesdropped on the quantum channel;
   in response to determining that the eavesdropper has eavesdropped on the quantum channel, sending a key-revocation message to a designated destination;
   determining, by the quantum computing system, an estimated amount of the key ascertained by the eavesdropper; and
   sending, to the designated destination, the estimated amount of the key ascertained by the eavesdropper; and
   wherein the designated destination comprises a first computing device, and further comprising:
      receiving, by the first computing device, the estimated amount of the key ascertained by the eavesdropper; and
      performing one of an under threshold action and an over threshold action based on whether the estimated amount of the key ascertained by the eavesdropper is less than a threshold amount or greater than the threshold amount, wherein the under threshold action comprises encrypting, by the first computing device, a message using the key to generate an encrypted message, and sending, by the first computing device, the encrypted message to a second computing device, and the over threshold action comprises deleting data that was previously encrypted using the key.

2. The method of claim 1 further comprising:
in response to an event, automatically generating, by the quantum computing system, using the plurality of qubits and the quantum channel using the quantum key distribution protocol, a new key.

3. The method of claim 2 wherein the event comprises a passage of a predetermined amount of time.

4. The method of claim 2 wherein the event comprises a receipt of a request from an entity to generate the new key, and further comprising sending the new key to the entity.

5. The method of claim 1 further comprising:
receiving, by the second computing device, the encrypted message; and
decrypting, by the second computing device, the encrypted message using the key to derive the message.

6. The method of claim 1 further comprising:
receiving, by the first computing device, the key-revocation message; and
in response to receiving the key-revocation message, invalidating the key to inhibit use of the key by the first computing device to encrypt subsequent messages.

7. The method of claim 1 further comprising:
receiving, by an access control system executing on one or more processor devices, a request by an entity to access an electronic resource;
identifying, by the access control system, at least one encrypted policy set of a plurality of encrypted policy sets, each encrypted policy set comprising access rights information that governs access to an electronic resource by an entity;
decrypting the at least one encrypted policy set using the key to generate a decrypted policy set; and
based on the decrypted policy set, sending, by the access control system, a message that grants the entity access to the electronic resource.

8. The method of claim 1 further comprising:
accessing, by an access control system executing on one more processor devices, the key;
decrypting, by the access control system using the key, a plurality of encrypted policy sets to generate a plurality of decrypted policy sets, each decrypted policy set comprising access rights information that governs access to an electronic resource by an entity;
receiving, by the access control system, a request by an entity to access an electronic resource;
identifying, by the access control system, at least one decrypted policy set of the plurality of decrypted policy sets; and
based on the at least one decrypted policy set, sending, by the access control system, a message that grants the entity access to the electronic resource.

9. The method of claim 8 further comprising:
sending, by the quantum computing system to the access control system, the estimated amount of the key ascertained by the eavesdropper;
determining, by the access control system, that the estimated amount of the key ascertained by the eavesdropper exceeds a predetermined threshold; and
based on determining that the estimated amount of the key ascertained by the eavesdropper exceeds the predetermined threshold, deleting the plurality of decrypted policy sets.

10. The method of claim 1 wherein the designated destination is an access control system executing on one or more processor devices, and further comprising:
receiving, by the access control system, the key-revocation message;
in response to receiving the key-revocation message, setting an access control state to a deny request state;
receiving, by the access control system, a first request by an entity to access an electronic resource;
determining that the access control state is in the deny request state; and
based on the access control state being the deny request state, sending a message that denies the entity access to the electronic resource.

11. The method of claim 10 further comprising:
sending, by the quantum computing system to the access control system, the estimated amount of the key ascertained by the eavesdropper;
sending, by the access control system to an alert destination, the estimated amount of the key ascertained by the eavesdropper; and
receiving, by the access control system, a command to set the access control state to an accept request state.

12. The method of claim 11 further comprising:
receiving, by the access control system, a second request by the entity to access the electronic resource;
determining that the access control state is in the accept request state;
accessing at least one decrypted policy set of a plurality of decrypted policy sets, each decrypted policy set decrypted from an encrypted policy set using the key, and each decrypted policy set comprising access rights information that governs access to an electronic resource by an entity;
based on the at least one decrypted policy set, sending a message that grants the entity access to the electronic resource.

13. A quantum computing system comprising:
two qubits;
a quantum channel; and
a processor device to:
  generate, using a quantum key distribution protocol, a key;
  determine that an eavesdropper has eavesdropped on the quantum channel; and
  in response to determining that the eavesdropper has eavesdropped on the quantum channel, send a key-revocation message to a designated destination;
  determine, by the quantum computing system, an estimated amount of the key ascertained by the eavesdropper; and
  send, to the designated destination, the estimated amount of the key ascertained by the eavesdropper; and
  wherein the designated destination comprises a first computing device, and wherein the first computing device is to:
    receive the estimated amount of the key ascertained by the eavesdropper; and
    perform one of an under threshold action and an over threshold action based on whether the estimated amount of the key ascertained by the eavesdropper is less than a threshold amount or greater than the threshold amount, wherein the under threshold action comprises encrypting, by the first computing device, a message using the key to generate an encrypted message, and sending, by the first computing device, the encrypted message to a second computing device, and the over threshold action comprises deleting data that was previously encrypted using the key.

14. A computer program product stored on a non-transitory computer-readable storage medium and including instructions configured to cause a processor device of a quantum computing system to:

generate, by the quantum computing system comprising a plurality of qubits and a quantum channel using a quantum key distribution protocol, a key;

determine, by the quantum computing system, that an eavesdropper has eavesdropped on the quantum channel; and in response to determining that the eavesdropper has eavesdropped on the quantum channel, send a key-revocation message to a designated destination;

determine, by the quantum computing system, an estimated amount of the key ascertained by the eavesdropper; and send, to the designated destination, the estimated amount of the key ascertained by the eavesdropper; and wherein the designated destination comprises a first computing device, and wherein the first computing device is to:

receive the estimated amount of the key ascertained by the eavesdropper; and perform one of an under threshold action and an over threshold action based on whether the estimated amount of the key ascertained by the eavesdropper is less than a threshold amount or greater than the threshold amount, wherein the under threshold action comprises encrypting, by the first computing device, a message using the key to generate an encrypted message, and sending, by the first computing device, the encrypted message to a second computing device, and the over threshold action comprises deleting data that was previously encrypted using the key.

\* \* \* \* \*